March 21, 1961 C. R. HANNA 2,976,052
VEHICLE STABILIZER, TILTER AND LEVELING MEANS
Filed Dec. 27, 1956 5 Sheets-Sheet 1

WITNESSES:
Robert C. Baird
George C. Thompson Jr.

INVENTOR
Clinton R. Hanna.
BY
Paul E. Friedemann
ATTORNEY

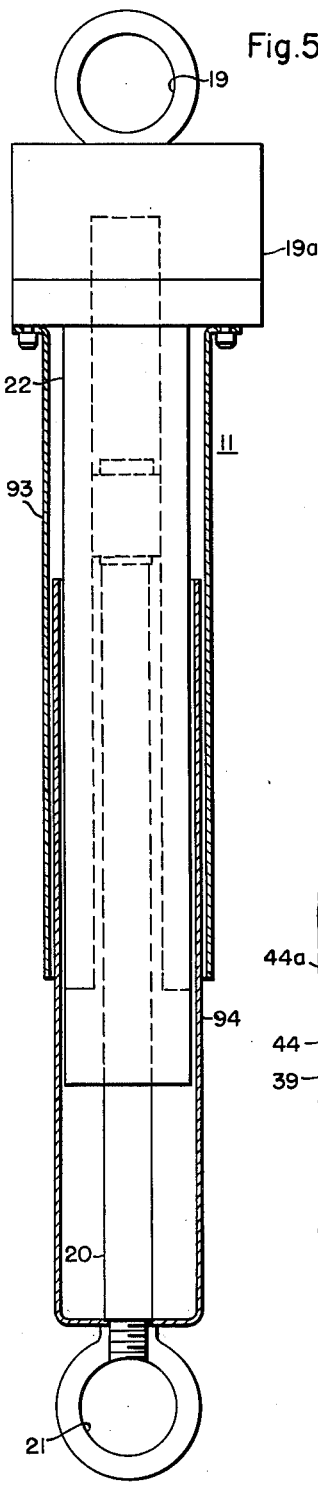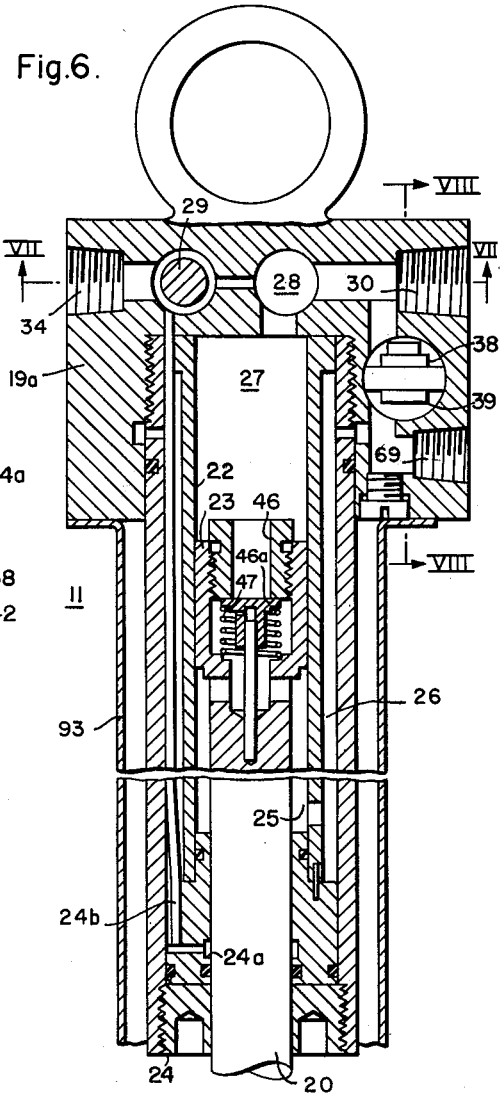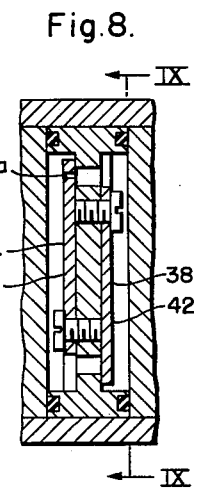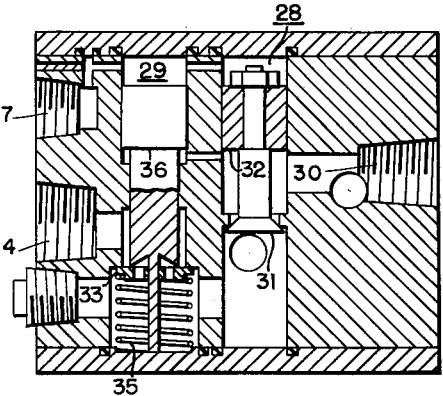

March 21, 1961 C. R. HANNA 2,976,052
VEHICLE STABILIZER, TILTER AND LEVELING MEANS
Filed Dec. 27, 1956 5 Sheets-Sheet 5

United States Patent Office 2,976,052
Patented Mar. 21, 1961

2,976,052

VEHICLE STABILIZER, TILTER AND LEVELING MEANS

Clinton R. Hanna, Pittsburgh, Pa., assignor to Westinghouse Electric Corporation, East Pittsburgh, Pa., a corporation of Pennsylvania Filed Dec. 27, 1956, Ser. No. 630,835

22 Claims. (Cl. 280—112)

This invention relates to a vehicle stabilizer, tilter and leveling means, and more particularly to a vehicle power shock absorber device having a sensing means for stabilizing, tilting and leveling a vehicle sprung mass upon the sensing of vertical and lateral accelerations as well as change in vertical load.

In present day conventional land vehicles, shock absorbing devices located between the sprung mass or body of the vehicle and the unsprung mass (usually comprising vehicle wheels and axles) are of the passive type. This type of shock absorbing device provides nearly adequate vehicle sprung mass oscillation attenuation when the frequency of the unsprung mass oscillatory movement is above the natural resonant frequency of the sprung mass. However, when the frequency of the unsprung mass oscillatory movement is approximately the same as the natural resonant frequency of the sprung mass, the passive shock absorber provides an inadequate means of preventing large sprung mass movements.

It is also common, with the use of passive shock absorbers, for present day vehicles to respond to lateral accelerations during a vehicle turn in a manner causing the sprung mass of the vehicle to lean outwardly from the center of the turn. Since the sprung mass is usually located above its roll axis, it can be seen that movement of the sprung mass away from the center of the turn tends to cause the center of gravity of the sprung mass to act in a direction to cause over-turning of the vehicle.

It is, therefore, an object of this invention to present a vehicle stabilizer providing a means of tilting the vehicle in a direction toward the center of the vehicles' turn in response to lateral accelerations.

It is another object of this invention to provide a vehicle stabilizer of the power type capable of reducing maximum peak road shocks.

It is still another object of this invention to provide a power stabilizer capable of reducing the resonance of the sprung mass shock down to a value considerably less than the natural frequency of the sprung mass.

It is another object of this invention to provide a sensing device for a power shock absorber that is responsive to vertical accelerations.

It is still another object of this invention to provide a sensing device for a power shock absorber that is responsive to lateral accelerations.

Another object of this invention is to provide a sensing device for power shock absorbers that is responsive to angular accelerations.

Another object of this invention is to provide a power stabilizing sensing device provided with a power feedback means for providing velocity control helping to prevent over-control.

Still another object of this invention is to provide a vehicle stabilizer sensing device provided with a rapid motion damping means.

Another object of this invention is to provide a power stabilizer system capable of leveling a vehicle sprung mass upon a change in load on the sprung mass.

Another object of this invention is to provide a power stabilizer capable of presenting a very high equivalent mass to actual mass ratio, and in addition, high passive damping when needed.

Another object of this invention is to provide a power stabilizing device capable of passive shock absorbing operation upon power source failure.

Other objects, purposes and characteristic features of this invention will become obvious as the description of this invention progresses.

It is a practice of this invention to provide stabilizing or shock absorbing means between sprung and unsprung masses at times when the unsprung mass is traversing uneven terrain. In the present invention this is accomplished through the use of a plurality of power shock absorbers connected between the sprung and unsprung masses. Each power shock absorber is provided with an acceleration sensing and control means capable of responding to vertical and lateral accelerations in such a way as to cause the sprung mass to appear as a very large equivalent mass. The sensing and control device of each shock absorber is mounted on the sprung mass and by responding to any acceleration of the sprung mass, either in the vertical or lateral direction, is capable of causing the power shock absorber to rapidly reduce the magnitude of the sprung mass accelerations. The power shock absorbing sensing devices are positioned on the sprung mass in a manner capable of detecting vehicle sprung mass lateral accelerations in response to a turn, and in response to such lateral accelerations cause the power shock absorbers to tilt the sprung mass toward the center of the vehicle circle. The resulting tilt action is continued until the vehicle sprung mass lateral accelerations have become neutralized, at which time the sensing devices act to maintain proper tilt and also to control vertical accelerations due to terrain unevenness.

The present invention also includes a vehicle leveling means utilizing a position controller for maintaining the relative spaced apart positions of the sprung and unsprung masses during a change in vehicle load.

Fig. 5 is a partially sectioned elevational view of the power shock absorber of this invention showing cylinder dust shields;

Fig. 6 is a sectional view showing the details of the piston and valve structures of a preferred form of the power shock absorber;

Fig. 7 is a sectional view taken along the line VII—VII of Fig. 6 showing valve structure;

Fig. 8 is a sectional view of the valve structure of Fig. 6 taken along the line VIII—VIII of Fig. 6 showing the details of the damper valve members;

Fig. 9 is a sectional view showing the structure of the damper valves shown in Fig. 8 and is taken along the line IX—IX of Fig. 8;

In each of the several views similar parts are designated by similar reference characters.

The shock absorbing system shown in Fig. 1 involving four power shock absorbers, to be described in detail hereinafter, is shown applied to a typical four wheeled vehicle of a well-known type. The vehicle comprises a frame 1 supported on leaf and coil springs 2 which are in turn secured to axles and wheels 3 in a conventional manner. The axles and wheels 3 will be referred to hereinafter as the unsprung mass of the vehicle, while the frame member 1 and its associated parts, such as an engine and a typical body (not shown) will be referred to as the sprung mass. With present day land vehicles the sprung mass is considerably heavier than the unsprung mass. The natural frequency of the sprung mass is thus considerably below that of the unsprung mass, which is also a desirable characteristic when attempting to reduce sprung mass oscillations.

Figure 1:
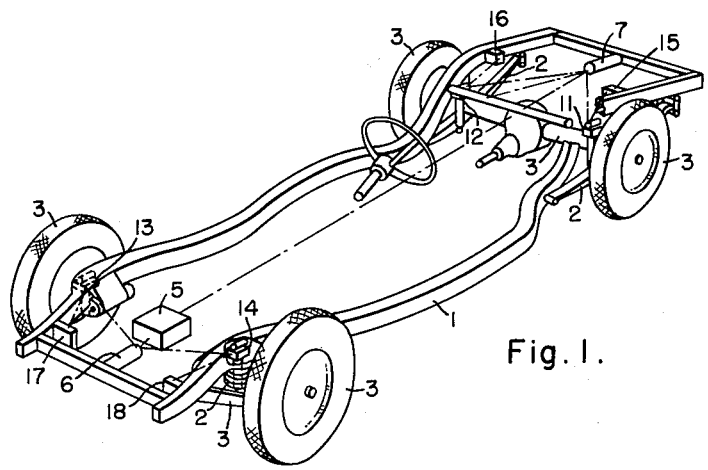
Fig. 1 is a diagrammatic view of a vehicle frame and under-carriage utilizing four power shock absorbing devices disclosed by this invention.

The power shock absorbing system shown in Fig. 1 is provided with a pump 5 for supplying fluid under pressure and a pair of accumulators 6 and 7. The pump 5 also includes a return reservoir such as the reservoir 8, shown in Fig. 4. The pump 5 has sufficient capacity to provide fluid under pressure for all four of the power shock absorbers as well as providing fluid under pressure for other auxiliary equipment (not shown) within the vehicle. The two accumulators 6 and 7 are placed at opposite ends of the vehicle in order to provide reasonably constant fluid pressures to the nearest pair of power shock absorbers. In addition, the pump 5 is provided with an unloading valve 9, shown diagrammatically in Fig. 4, for bypassing or circulating fluid pumped by the pump 5 after the desired pressure level has been reached in each of the accumulators and during little or no shock absorbing action.

The view of Fig. 1 discloses the use of four power shock absorbers, generally designated as 11, 12, 13 and 14. Each power shock absorber is provided with sensing and control devices, designated 15, 16, 17 and 18 respectively. Each of the sensing devices 15, 16, 17 and 18 is mounted on the body or sprung mass 1 of the vehicle above and to one side of the roll axis of the sprung mass. Since each of the power shock absorbers performs in an identical manner, a typical power shock absorber is shown in Fig. 4 and is used to describe the operation of any one of the power shock absorbers 11, 12, 13 and 14.

Figure 4:
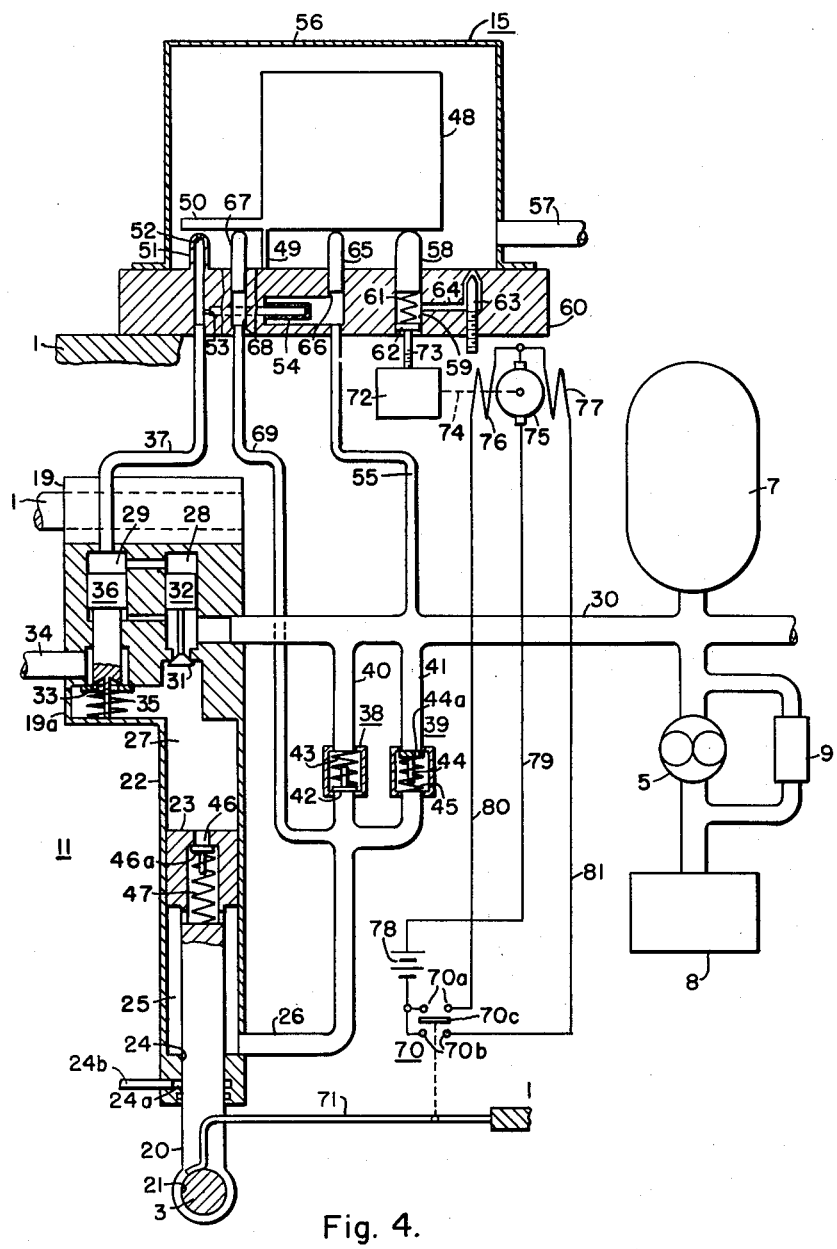
Fig. 4 is a diagrammatic view of one power shock absorber and its associated power source and sensing elements. The view also includes a diagrammatic showing of a typical sensing element leveling control.

If we assume that the typical shock absorber, shown in Fig. 4, is the shock absorber designated generally as 11 positioned on the left of the vehicle as viewed from the rear of Fig. 1, it can be seen that the structure has a sprung mass 1 secured by a bushing 19 to an upper portion 19a housing control valves and a lower portion or piston rod 20 which is secured to the unsprung mass 3 by a bushing 21 (see Fig. 4). The upper portion 19a, secured to the sprung mass 1, is provided with an integral cylinder 22 extending downwardly for receiving a piston 23 which is integral with the lower portion or piston rod 20. The cross-sectional area of piston rod 20 is equal to one half of the downwardly faced area of the piston 23 and is provided with a fluid sealing slip bushing 24 secured to the cylinder 22 of the upper portion 19. The bushing 24 is provided with a fluid annular ring leakage return passage 24a and a fluid return pipe 24b for preventing fluid leakage from the high pressure area within the cylinder 22 to the low pressure of the outside area. It also serves to reduce the friction of bushing 24 which would be quite high if subjected to the average cylinder pressure. The piston 23 and the end sealing bushing 24 in cooperation with the cylinder 22 form a chamber 25 provided with fluid under pressure from the associated accumulator 7 delivered through the pipe 26 in a manner to be described hereinafter. A second chamber 27 is formed by the cylinder 22 and the end of the piston 23 opposite to the piston rod 20. The chamber 27 is in communication with a pair of fluid control valves 28 and 29 so that fluid may be admitted or relieved from the chamber 27 in a manner demanded by the sensing element 15 and the movement of the piston 23 to be described hereinafter.

The valve 28 is a pressure fluid admission valve capable of delivering fluid from the accumulator 7 through the supply pipe 30, past the valve closure end 31 into the chamber 27. The valve 28 is provided with a piston 32, subjected on one side to the accumulator pressure and on the other side to a balancing force pressure determined by the sensing element, as explained hereinafter.

The valve 29 is an exhaust valve capable of allowing fluid to flow from the chamber 27, out past its valve seat 33 and into the fluid return pipe 34. The valve seat 33 of the exhaust valve 29 is a spring biased seat which is normally stationary but operable under emergency conditions of power failure to prevent a completely inoperative shock absorber, as explained hereinafter. It is sufficient to note at this time that upon a pressure drop in the chamber 27 during fluid supply failure, the valve seat 33 is drawn downwardly causing an associated coil bias spring 35 to be compressed. This allows fluid to flow from the return pipe 34, past the valve seat 33 and into the chamber 27. The exhaust valve 29 is provided with an actuating piston 36 which is subjected to accumulator pressure on the valve side of the piston and to a lower sensing element adjusted pressure on the side of the piston opposite the valve seat 33.

Accumulator pressure acting against the fluid control end 31 and the valve end side of the piston 32 results in a force in a direction to seat the valve end as shown in Fig. 4. This force is opposed by the sensing element 15 varied fluid pressure received through a pipe 37 to act on the larger area of the opposite side of the piston 32. Under normal conditions, with no accelerations being detected by the sensing element or device 15, the forces on the piston 32 of the intake valve 28 are approximately equal with the valve 31 being seated by the pressure applied by the fluid in chamber 27. Likewise, the pressures supplied to the piston 36 by the accumulator and the sensing feed pipe 37 as well as the chamber 27 applied pressure on the valve, all result in approximately no control or moving forces with the exhaust valve holding in its seated position.

The above-described relationship of pressure to piston areas of the valves 28 and 29 is established so that the response of the valves is as near to a linear response as possible. This is shown in the pressure pilot orifice curve of Fig. 13 described in greater detail hereinafter. With the valve forces so equalized, movement of the shock absorber piston 23 can command immediate fluid movement into or out of the chamber 27 with the sensing and control device then applying pressure and exhaust valves 28 and 29 control in response to sprung mass movement.

Located within the pressure feed from the accumulator 7 to the lower chamber 25 of the power shock absorber 11 is a pair of damper valves 38 and 39. The damper valves 38 and 39 are positioned in fluid pipes 40 and 41, respectively, interconnecting the main fluid supply pipe 30 with the lower chamber 25 through the feeder pipe 26. The damper valve 38 is a spring controlled valve capable of allowing flow from the chamber 25 to the accumulator 7 only. This valve comprises a movable member 42 held to its seated position by a spring 43 with zero force for that position.

The damper valve 39 is a similar valve positioned to allow flow from the accumulator 7 to the lower chamber 25 only. This valve involves a movable member 44 provided with a spring 45 for seating the valve in the position shown. Under the conditions of inactivity shown in Fig. 4, the pressure within the chamber 25 is equal to the accumulator 7 pressure.

The movable member 44 is provided with an orifice 44a passing therethrough for causing the action of the damper valve 39, as well as the damper valve 38, to follow a more nearly straight line of response. The orifice 44a is needed since without the orifice the rate of fluid transfer past the damper valves is slow at the beginning of a difference in pressure and increases as the pressure rises. The action of the orifice 44a to a difference in pressure is the opposite, with a rapid flow rate of change at the beginning and a reduced rate of change as the pressure rises. The two actions combined thus result in a more nearly straight line response curve.

One effect of the provision of damper valves 38 and 39 is to cause the pressure in passage 26 and chamber 25 to have substantial differences from the main supply pressure in passage 30 during movement of the piston 23. The pressure changes in passage 26 vary with the velocity of the piston movement and are used to give velocity control through a feedback arrangement hereinafter described. The other effect of the damper valves is to give damping of the movements of the vehicle masses.

The piston 23 within the cylinder 22 is provided with a normally closed emergency flow valve 46 having a movable member 46a biased to its closed position by a bias spring 47. The valve 46 is used to interconnect the chamber 25 with the chamber 27 under conditions of power source failure, as will be explained hereinafter.

The power shock absorber is controlled by a sensing and control device 15, which, as explained hereinbefore, is securely fastened to the frame or the sprung mass 1 of the vehicle. The sensing and control device 15 comprises a weight 48 supported on a pair of leaf springs 49, disposed in spaced relation in the same plane adjacent one corner of the weight 48 such that the center of gravity of the weight 48 is to one side and above the leaf springs 49. Projecting outwardly from the weight 48, adjacent to and on the opposite side of the support springs 49, is a pilot valve control arm 50. Positioned adjacent to and slightly spaced from the pilot valve control arm 50 is a pilot valve thimble 51, having an orifice 52 in the end thereof. The pilot valve thimble 51 is connected to the accumulator 7 through an orifice 53, filter 54 and the pressure pipes 55 and 30. The pilot valve thimble is also connected to the intake and exhaust valves 28 and 29 of the power shock absorber 11 through the previously mentioned pilot valve control pipe 37. It can be seen, therefore, that the accumulator fluid, under pressure, is fed through the pipe 30, the pipe 55, the filter 54 and orifice 53 filling the pilot valve control fluid pipe 37 and flowing through the orifice 52 in the pilot valve thimble 51. The fluid flow out of the orifice 52 fills the chamber about the sensing weight 48 within the cover 56 and returns to the reservoir 8 through a return pipe 57. It can be seen that controlled fluid flow occurs through the orifice 52 with the amount of flow being determined by the proximity of the pilot valve control arm 50 to the orifice 52. This flow variation through the orifice 52 in turn causes a pressure variation on the control pistons of the power shock absorber intake and exhaust valves 28 and 29, respectively.

Since the pivot point of the weight 48 is to one side of the center of gravity, it is necessary to provide a static balance for the weight 48. This static balance is provided through a piston 58 positioned within an opening 59 in the base 60 of the sensing and control device 15. The piston 58 is biased upwardly against the bottom of the weight 48 by a bias spring 61 provided with a variable support 62 for varying the amount of bias presented to the sensing and control weight 48. In addition, the piston 58 is provided with fluid damping through a needle valve 63 having an orifice and pipe 64 interconnecting the area within the sensing weight 48 cover or shell 56 with the area below the piston 58, housing the bias spring 61. In this way, fluid enters past the needle valve 63 through the passage 64, and is restricted in its movement into and out of the area below the piston 58 by the size of the orifice which is adjusted by the needle valve 63. The action of this fluid damping is necessary to eliminate resonant vibrations of the control mass.

Since variations in the accumulator pressure supplied by the pump 5 would inherently affect the balance of the weight 48, a pressure compensating piston 65 is positioned in contact with the bottom of the sensing weight 48. The compensating piston 65 is positioned within a bore 66 connected with the filter chamber 54 and fluid supply pipe 55. It can be seen then that variations in the accumulator pressure will then be reflected in the force of piston 65 on the sensing weight 48 to compensate the average forces of the orifice 52 and piston 67 on the opposite side of the pivot 49. Thus the weight 48 assumes the same average position for varying accumulator pressures.

In order to introduce velocity control to the sensing weight 48 in addition to the acceleration control previously described, a feedback piston 67 is provided. The piston 67 cooperates with the pilot valve control arm 50 at a point to the left of the pivot springs 49, as viewed in Fig. 4. The feedback piston is housed within a bore 68 in the base 60 and is connected to the chamber 25 of the power shock absorber by a fluid control pipe 69. For this reason the response of the feedback piston 67 depends upon pressure variations which are proportional to the relative velocity of the movement of the piston 23 within the cylinder 22 reflected in relatively small pressure changes in the chamber 25 above or below the accumulator pressure during fluid flow through one of the damper valves 38 or 39.

Operation of the power shock absorber system of Fig. 4, as described up to this point, will now be explained. If we assume that the vehicle is passing over an uneven surface in which the unsprung mass 3 is driven upwardly toward the sprung mass of the frame 1, the action of this motion through the power shock absorber and the supporting springs 2 would then cause a vertical acceleration on the weight 48 of the sensing device 15. Since the motion of the frame or the sprung mass 1 is in an upward direction, the weight 48 resists the upward movement resulting in a lagging of the weight downwardly causing the pilot valve orifice 52 to be relieved, allowing greater fluid flow through the orifice. This is due to the weight 48 pivoting clockwise about the leaf springs 49, since the center of gravity of the weight is to the right of the pivot springs 49.

An increase in flow through the orifice 52 results in a reduction of pressure in the pilot control pipe 37 and on the pistons 32 and 36 of the intake and exhaust valves 28 and 29 of the power shock absorber. The resulting reduction in pressure above each of the pistons 32 and 36 then causes the accumulator pressure on the under side of the pistons 32 and 36 to result in a more firm seating of the intake valve 28 and an opening of the exhaust valve 29. When this occurs, a rapid reduction in pressure within the chamber 27 of the power shock absorber takes place, allowing the piston 23 to move rapidly upward in response to the uneven terrain. The pressure from the accumulator in chamber 25 causes the force on the under side of the piston 23 to exceed the force on the upper side with the result that upward accelerations of the sprung mass are greatly impeded. The rapid upward movement of the piston 23 reduces the pressure within the chamber 25 slightly, however, causing the damper valve 39 to open and supply more fluid to the chamber 25. The reduction in pressure within the chamber 25 also results in a reduction of the force imposed on the pilot valve control arm 50 by the feedback piston 67. This action tends to reduce the flow through the pilot valve orifice 52 with the result that damping of the resonances of the vehicle masses occurs.

Figure 11:
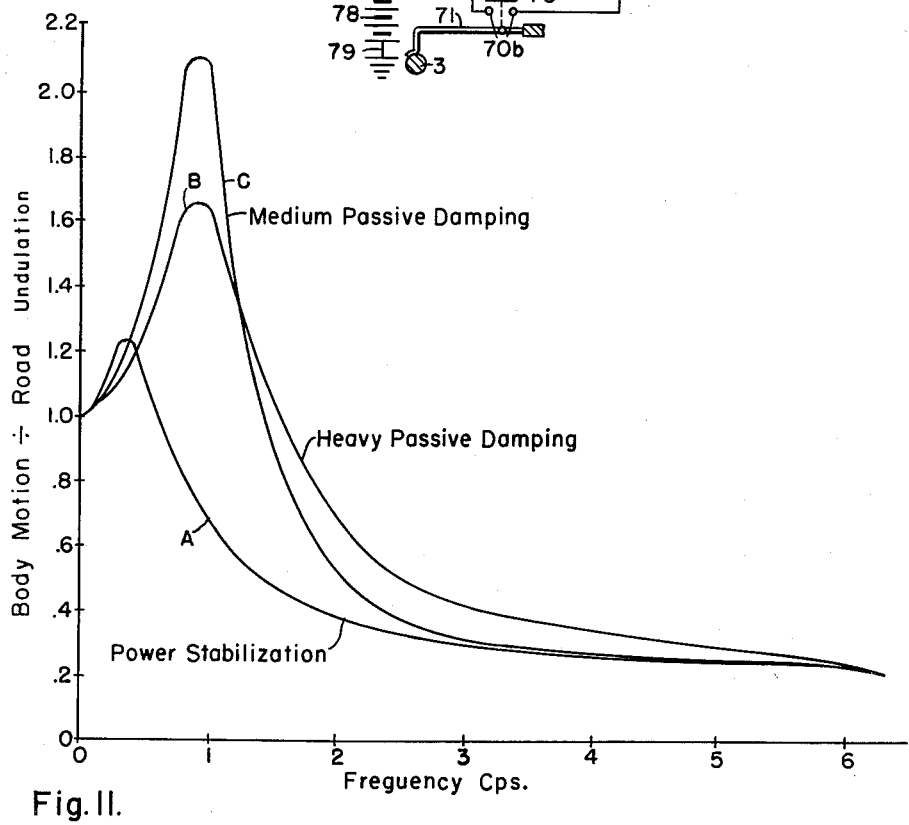
Fig. 11 is a graph showing the relationship of body undulation divided by the road undulation to the frequency of the sprung mass movement.

The graph shown in Fig. 11 discloses a family of curves showing the response of the sprung mass of a vehicle with different types of shock absorbers applied thereto, and with the unsprung mass being moved at constant amplitude over a range of frequencies from less than one cycle per second to six cycles per second.

Curve A is a curve showing the sprung mass response with the power shock absorber of this invention applied thereto. As shown by this curve, the peak in undulations of the sprung mass relative to road undulations occurs at a point well below one cycle per second and is only 1.2 times the amplitude of the road undulation.

Curve B is a curve showing the sprung mass response using a conventional passive type shock absorber of heavy damping quality. The peak with this device occurs at approximately the one cycle per second period and is nearly 1.7 units in amplitude. In addition, the magnitude of the response of the sprung mass at higher frequencies is greater.

In order to reduce the magnitude of the high frequency response of the sprung mass while using passive type shock absorbers, the damping action of the shock absorber is reduced as shown by curve C. It is obvious, however, that in order to obtain good high frequency response with passive type shock absorbers a sacrifice in low frequency response occurs. As shown by curve C the peak rise occurs at the one cycle per second frequency and is 2.1 units in amplitude.

From the results shown by the family of curves of Fig. 11 it is clear that control of pressures within the power shock absorber of this invention through the use of an acceleration sensing device provides greatly improved sprung mass response as compared to response under conventional passive shock absorber control devices.

Referring again to Fig. 4 under operation involving a separation of the sprung and unsprung masses due to the unsprung mass 3 following a depression in the surface being traversed, it can be seen that a pressure rise within the chamber 25 takes place. The increase in pressure within the chamber 25 as the piston 23 attempts to move downward along with the unsprung mass causes the sprung mass to attempt a following action. The acceleration of the sprung mass downwardly causes the weight 48 to pivot counterclockwise about its support springs 49, resulting in a restriction of the orifice 52 in the pilot thimble 51. This restriction causes a rise in pressure in the chambers above the pistons 32 and 36 of the intake and exhaust valves, respectively. The rise in pressure above each of the pistons 32 and 36 results in an opening of the intake valve 28 and a more firm seating of the exhaust valve 29. Opening of the intake valve 28 results in an increase in pressure within the chamber 27, aiding the piston 23 in its downward movement due to the separation of the sprung and unsprung masses. The resultant increase in pressure within the chamber 25 is then relieved through the damper valve 42 into the accumulator 7 system. This rise in pressure within the chamber 25 also results in a feedback pressure increase on the piston 67. The action of the piston 67 then results in a clockwise rotation tendency of the weight 48 with the end result being a velocity stabilization of the original or initial action of the weight 48.

It should be pointed out at this time that the pressure within the chamber 25 is approximately twice that of the pressure within the chamber 27 under periods of stabilization. The resultant forces on the piston 23 are equal and opposite since the affected area of the piston 23 in the high pressure zone of the chamber 25 is one-half of the area of the piston 23 exposed to the chamber 27. For example, a typical accumulator pressure might be on the order of 2000 p.s.i. with the resulting pressure within the chamber 25 under static conditions also being 2000 p.s.i. The pressure within the chamber 27, however, would only be 1000 p.s.i. due to the action of the valves 28 and 29. This, theoretically, provides an active range for the control valves 28 and 29 of from zero to 2000 p.s.i. within the chamber 27. The pressures of the chamber 25 vary a smaller amount, however, this amount occurs about the 2000 p.s.i. level. It is this difference in pressure between the chamber 25 and the chamber 27 during operating of the pump supplying pressure to the power shock absorber that maintains the emergency flow valve 46 closed at all times.

Figure 13:
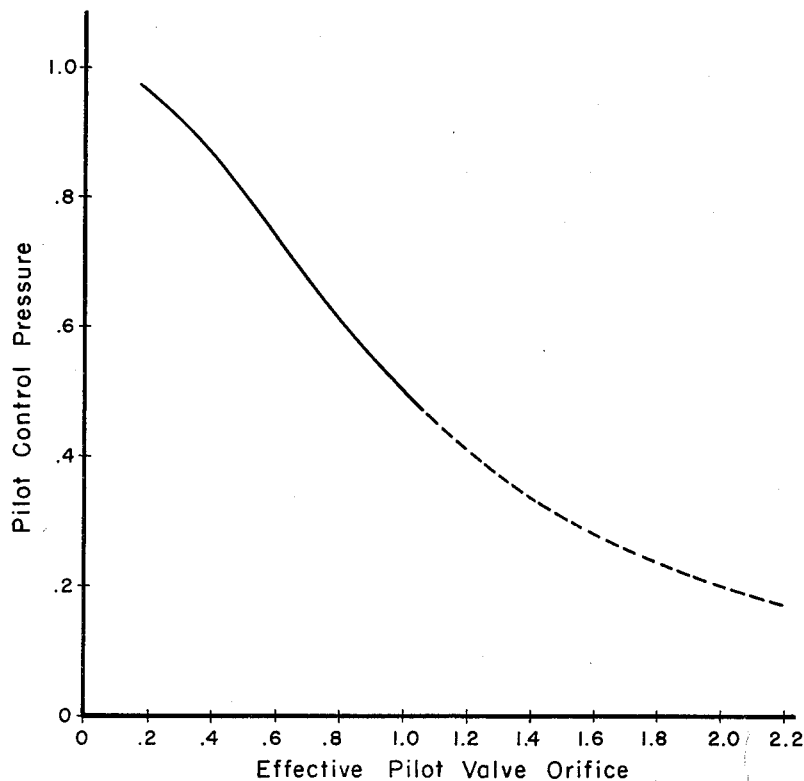
Fig. 13 is a graph showing a response curve of the pilot valves in each of the sensing elements in which the pressure is plotted against the valve orifice opening area.

It should also be pointed out that the intake and exhaust valves 28 and 29 are operated at a high pilot pressure level in order to have the action of these valves occur over the most nearly straight portion of the pressure response curve for the valves, as shown in Fig. 13. As shown by this graph, plotted for a 2000 p.s.i. accumulator pressure, the straight line portion of the curve occurs between maximum and minimum pilot valve orifice opening establishing pilot pressures of between 1000 p.s.i. and 2000 p.s.i. The piston area relationships of the valves 28 and 29 are thus selected to allow valve operation within this pressure zone.

Operation of the power shock absorber in response to lateral accelerations will now be explained. If we assume the vehicle is starting into a turn to the right, as viewed in Fig. 4, with the assumption that the power shock absorber is located on the left side of the vehicle as seen from the rear, such as the power shock absorber 11 of Fig. 1, the acceleration of the vehicle to the right causes the weight 48 to pivot counterclockwise about the leaf springs 49. This results in a restriction of the orifice 52 of the pilot valve thimble 51, resulting in a rise in pressure in the areas above the pistons 32 and 36 of the feed and exhaust valves 28 and 29, respectively. As explained hereinbefore, this results in an increase in pressure above the pistons 32 and 36 causing the intake valve 28 to open and the exhaust valve 29 to become more firmly seated. The opening of the valve 28 results in an increase in pressure within the chamber 27 and a movement of the piston 23 downwardly, separating the sprung and unsprung masses. Since this power shock absorber is indicated as being located on the left side of the vehicle as seen from the rear, it should be obvious that a tilting action of the vehicle sprung mass toward the center of the circle takes place.

With the sensing mass 48 having its center of gravity displaced both horizontally and vertically from the effective pivot axis of the mass provided by the spring 49, to give response to both vertical and lateral accelerations, and if the sensing mass is positioned above and to one side of the roll axis of the spring mass 1; the sensing mass is positioned on the sprung mass relative to its roll axis so that the sensing mass response to vertical accelerations exceeds its response to lateral accelerations as the sprung mass is accelerated angularly about said roll axis and the net response is in the right direction to give tilting action of the sprung mass toward the center of the vehicle turning circle.

At the same time, the power shock absorber 12 on the right side of the vehicle, as seen from the rear of the vehicle of Fig. 1, with its sensing element 16 positioned 180° with respect to the sensing element 15 of the shock absorber 11, would cause the sprung and unsprung masses to be drawn together. If we assume that the sensing element 15 of Fig. 4 is reversed 180° from the position shown therein, it can be seen that the weight 48 would be pivoted by its support leaf springs 49 in a direction to cause a relief of the orifice 52, allowing greater flow from the orifice and a resulting in a reduction in pressure within the chambers above pistons 32 and 36 of the valves 28 and 29, respectively. As explained hereinbefore, the reduction in pressure causes the exhaust valve 29 to open and the intake valve 28 to be more fully seated. This results in a reduction in pressure within the chamber 27, causing the piston 23 to move upwardly within the cylinder 22. The result is a reduction of the distance or spacing between the sprung and unsprung masses on the right side of the vehicle.

Since the piston of the power shock absorber 14 and its sensing element 18 is similar to that of the shock absorber 11, that is, being positioned on the left side of the vehicle, it can be seen that the previously mentioned turn to the right would also cause an extension of the power shock absorber 14 in a manner similar to the power shock absorber 11. Likewise, the power shock absorber 13 would have a resulting action to a vehicle turn to the right that is similar to the power shock absorber 12, that is, a contraction of the power shock absorber elements, causing the space between the sprung and unsprung masses to be reduced as the masses are pulled toward each other on the right side of the vehicle.

The cooperating action of all four shock absorbers shown in Fig. 1 in response to a turn to the right, would therefore result in a tilting of the sprung mass, involving the frame 1 of the vehicle, toward the center of the circle.

It is pointed out that with the present invention the acceleration response of the power stabilizer effectively increases the equivalent sprung mass of the vehicle several fold. Any force, such as the vehicle spring force or damping force due to high velocity of the unsprung mass relative to the sprung mass, therefore causes much lower acceleration of the body than with conventional shock absorbers. Such lower accelerations are the same as would occur had the springs been softer and the relative damping lower. It can be shown that insofar as the unsprung mass movements are concerned, the damping is in actuality reduced.

Let the equivalent mass M due to the acceleration response be related to the body mass $m$ by a factor K.

$$M = Km$$

For critical damping of the body resonance with springs having stiffness S, the damping is $$R = 2\sqrt{(M+m)S}$$
$$= 2\sqrt{(K+1)mS}$$

If $K=8$, then $R=6\sqrt{mS}$, which value is much higher than is tolerable with conventional shock absorbers.

The available damping for the unsprung mass can be shown to be $$r = \frac{R}{K+1}$$

$$= 2\sqrt{\frac{mS}{K+1}}$$

For $K=8$ as before $=\frac{2}{3}\sqrt{mS}$, a smaller but reasonable value which is of the order needed for wheel damping.

Thus the power-actuated piston or force producing means 23 develops forces in proportion to or varying with the accelerations of the body or sprung mass 1, and also has damping forces in proportion to or varying with the velocity between the sprung and unsprung masses, with the damping forces corresponding to several times critical damping for the normal resonance of the sprung mass 1 and the springs 2 on which it is mounted.

The combination of high acceleration response with high damping due to relative movement, therefore, provides greatly increased impedance to body movements but normal low damping impedance to wheel movements.

At times of power failure it is necessary for the power shock absorbers to provide passive shock absorber action similar to conventional shock absorbers. The previously described movable valve seat 33 and emergency valve 46 provide the means of satisfactory emergency operation.

If the unsprung mass 3 causes a downward movement of the piston 23 during power failure, the chamber 27 experiences drop in pressure causing a fluid demand. This demand is satisfied by the opening of the valve seat 33 against its bias spring 35, allowing fluid flow from the return pipe 34 into the chamber 27. At the same time the chamber 25 experiences a rise in pressure which is allowed to escape through the damper valve 38 into the accumulator 7 system.

Upon a movement of the unsprung mass 3 and piston 23 upwardly, the pressure within the chamber 27 rises. With impeded fluid escape through the valves 28 and 29, the fluid is relieved through the emergency valve 46 into the chamber 25 which is simultaneously experiencing a reduction of pressure.

The movement of fluid through the valves 38 and 46 and the valve seat 33 provides adequate passive shock absorber action. This passive shock absorber action may actually be improved due to the partial inertia control which can occur as the accumulator is charged by the pumping action of the chamber 25.

The system of Fig. 4 also discloses a leveling control for the shock absorber 11. This leveling control is also used to control the shock absorber 12 of Fig. 1. The purpose of the leveling control is to provide a readjustment of the relative distances between the sprung and unsprung masses when a change in load occurs within the sprung mass 1 including the vehicle body (not shown). The leveling structure shown in Fig. 4 comprises a leveling control switch 70 having two pairs of contacts 70a and 70b supported on the sprung mass of the vehicle. Associated with the two pairs of contacts 70a and 70b is a shunting bar 70c capable of selectively bridging each pair of contacts upon certain changes of load conditions within the vehicle. The bridging contact 70c is controlled by a resilient leaf spring 71 having one end secured to the under-carriage or unsprung mass 3 and the other end secured to the sprung mass 1, as shown in Fig. 4. The leaf spring 71 provides a means of introducing a large motion ratio between the unsprung mass 3 movement and bridging contact 70c movement. The addition of a load within the vehicle causing the sprung mass 1 to settle causes the bridging contact 70c to bridge the pair of contacts 70a completing an electrical circuit, to be described hereinafter. If, however, a load is removed from the vehicle, causing the sprung mass 1 to rise, with respect to the unsprung mass, the bridging contact 70c is caused to bridge the pair of contacts 70b completing a second electrical circuit, to be described hereinafter.

Supported on the sprung mass 1 in a position to reposition the variable support 62 of the bias piston 58 in the sensing element 15, is a gear train 72 having a gear ratio input to output of several hundred to one. The output of the gear train 72 is delivered to the variable support 62 through a vertically moving shaft 73. The gear train 72 is provided with an input shaft 74 driven by a reversible motor 75. As shown in Fig. 4, the motor 75 is provided with a pair of windings 76 and 77 for causing the motor to rotate in one direction or the other.

The switch 70 has one of each of its pairs of contacts 70a and 70b connected in parallel and through a source of power 78, a conductor 79 to the armature of the motor 75. The other terminal of the pairs of contacts, indicated as 70a, is then connected through a conductor 80 to the winding 76, which has its other end connected to the armature of the motor 75. Likewise, the other contact of the pairs of contacts 70b is connected through a conductor 81 of the winding 77, which is also connected to the armature of the motor 75.

It can be seen, therefore, that displacement of the sprung mass downwardly causes the bridging contact 70c to bridge the contacts 70a, energizing the motor 75, through its winding 76, causing a rotation of the shaft 74 and an extension of the output shaft 73 of the gear train 72. Extension of the shaft 73 in turn increases the bias pressure on the piston 58, which then causes the sensing weight 48 to pivot counterclockwise about its resilient leaf springs 49, restricting the output of the pilot orifice 52 and thus increasing the fluid flow and pressure within the chamber 27 of the power shock absorber 11, as explained hereinbefore. This action drives the piston 23 downwardly causing separation movement of the sprung and unsprung masses until the contact 70c is again separated from the contacts 70a.

If a load is removed from the vehicle sprung mass, it can be seen that the contact 70c then bridges the contacts 70b, causing a reverse action to take place. It should be pointed out at this time that it is necessary for a time delay to be introduced between the action of the contact switch 70 and the resulting motion delivered by the power shock absorber 11. This time delay is desirably from one to two minutes in length and it is introduced by the high ratio of the gear train 72.

Figure 2:
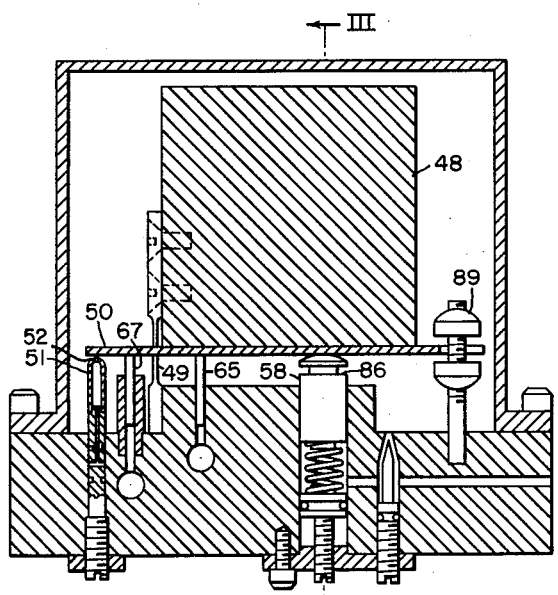
Fig. 2 is a sectional view of the power shock absorbing sensing and control device of this invention.
Figure 3:
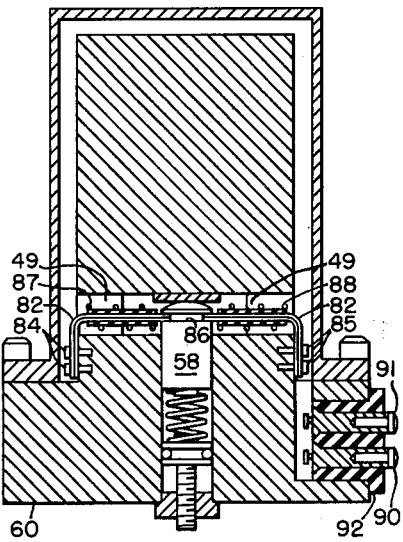
Fig. 3 is a sectional view of the sensing device taken along the line III—III of Fig. 2.
Figure 10:
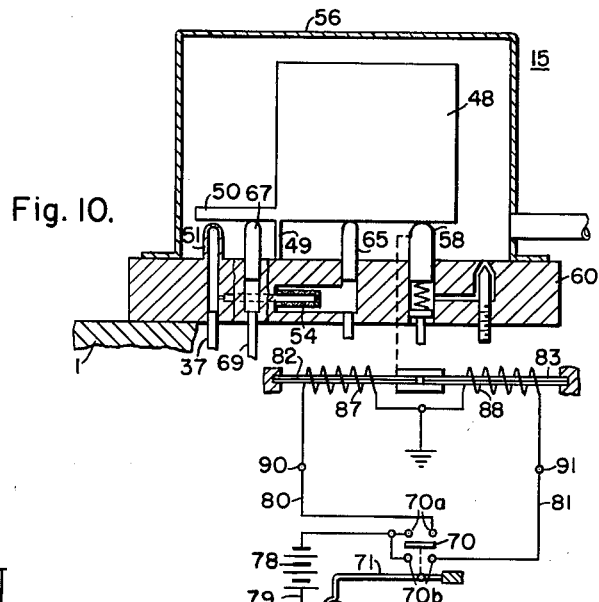
Fig. 10 is a diagrammatic view of a typical sensing and control element showing another means of providing leveling control.

An alternative method of providing vehicle leveling control to that shown in Fig. 4 is shown in the detailed embodiment of Figs. 2 and 3 and the diagrammatic illustration of Fig. 10. In this embodiment the piston 58 is provided with a leveling bias structure comprising two bimetallic strips 82 and 83 secured to the base 60 by the screws 84 and 85, respectively, and inserted at their other ends into a slot 86 in the head of the piston 58. The bimetallic strip 82 is provided with a heater winding 87 and the bimetallic strip 83 is provided with a heater winding 88. The heater windings 87 and 88 are connected into a circuit shown in Fig. 10 with the heater element 87, for example, connected to ground and through the terminal 90 to the conductor 80 and the heater element 88 connected to ground and through the terminal 91 to the conductor 81. The parallel connected members of the contacts 70a and 70b are connected through the battery 78 and conductor 79 to ground. With this circuit arrangement it can be seen that a selected one of the heater elements can be energized through the previously described controller switch 70, while the remaining element remains deenergized.

The bimetallic strips 82 and 83 are secured to the base 60 in such relative positions that when heated, the strip 82 bows upwardly and the strip 83 bows downwardly. With the two members simultaneously and constantly in engagement with the piston 58, it can be seen that a change in ambient temperature would result in opposing forces being applied to the piston 58 with no change in the position of the piston 58. A heating of one bimetallic strip with respect to the other, would, however, result in a raising or lowering of the piston 58. The specific thermal or bimetallic means for leveling in response to changes in load is claimed in the application of Lawrence B. Lynn and myself filed concurrently herewith and issued November 18, 1958, as Patent No. 2,860,889.

In the views of Figs. 2 and 3 the support leaf springs 49 are secured to the weight 48 at a point above the lower surface of the weight. This difference in support over that shown in Fig. 4, where the pivot point occurs below the weight 48, has been found to be desirable in some cases for the purpose of changing the ratio of vertical to lateral acceleration response. Although the pivot point is shown to be approximately even with the lower surface of the sensing weight 48 in Figs. 2 and 3 and shown to be below the sensing weight 48 in Fig. 4, it is obvious that this pivot point could also be well above the lower surface of the weight 48, the essential requirement being that the effective pivot point be displaced vertically above or below the center of gravity of the mass to give response to lateral accelerations and horizontally to either side of the center of gravity of the mass to give response to vertical accelerations. Otherwise, the position of the pivot point is a matter of choice or design necessary for obtaining the proper response ratio.

The view of Fig. 2 also differs from the showing of Fig. 4 by including a sensing weight travel limitor 89 for preventing over movement of the sensing weight 48. In Fig. 3, there is also shown a pair of terminals 90 and 91 secured within an insulating block 92 supported on the base 60 of the sensing device 15. The terminals 90 and 91 are used to connect the heater elements 87 and 88 to the conductors 80 and 81, respectively, for leveling control. As shown in Fig. 10, the common terminal of the heater elements 87 and 88 is connected to ground with the ground acting as the conductor 79 of Fig. 4. Ground in this case would normally be the chassis or vehicle frame mass 1.

The views of Fig. 5 through Fig. 9 disclose a preferred structure of the power shock absorber of the present invention, with Fig. 5 showing a dirt shield comprising telescoping tubes 93 and 94 housing the cylinder 22 and piston rod 20 of the power shock absorber. The view shown by Fig. 6 is functionally the same as the upper portion of the power shock absorber of Fig. 4, however, it shows the preferred arrangement of the damper valves 38 and 39 as being located within the upper head portion 19a of the shock absorber 11 along with the power control valves 28 and 29. This allows the use of soft or flexible tubing in the fluid supply pipes 30, 40 and 41, which are supplied by accumulator pressure. Fig. 7 shows the details of the placement of the power control valves 28 and 29, the structure of which was previously discussed in connection with Fig. 4. Figs. 8 and 9 disclose the damper valves as being leaf spring-type valves capable of opening and allowing flow in one direction only. This eliminates the necessity of separate bias springs for these valves and provides zero bias at times when the valves are closed.

Figure 12:
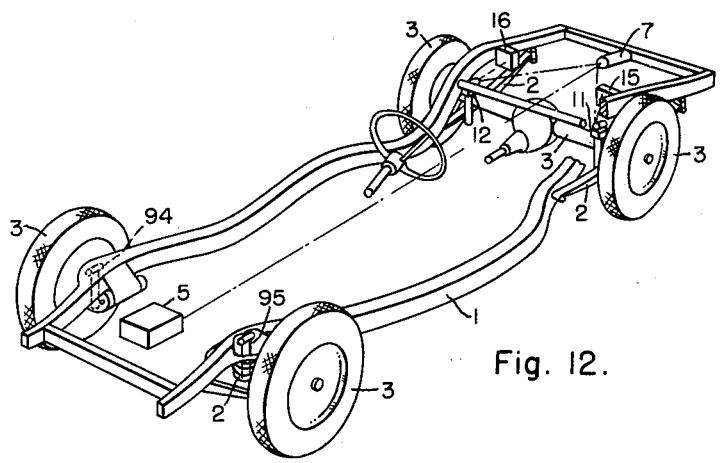
Fig. 12 is a view showing a modification of this invention in which the power shock absorber application is made to the rear wheels with the use of conventional passive shock absorbers on the front wheels.

In some cases, it may be desirable to provide two power driven shock absorbers 11 and 12 and two conventional passive type shock absorbers 94 and 95 on a four wheeled vehicle. Under these conditions, the two power driven shock absorbers 11 and 12 are located adjacent the rear wheels of the vehicle similar to the power shock absorbers 11 and 12 of Fig. 12. The two power shock absorbers 11 and 12 then provide all tilting control of the vehicle due to motion of the sprung mass about its roll axis within a turn and also provides vehicle leveling control as explained hereinbefore in connection with Fig. 4. With the two rear shock absorbers performing the full function of tilting and leveling of the vehicle in addition to shock absorption, the two front shock absorbers 94 and 95 provide only cooperating passive shock absorbing operations.

Since numerous changes may be made in the above described construction and different embodiments of the invention may be made without departing from the spirit and scope thereof, it is intended that all the matter contained in the foregoing description or shown in the accompanying drawings shall be interpreted as illustrative and not in a limiting sense.

I claim as my invention:

1. In a stabilizer for a vehicle having sprung and unsprung masses, a power source, sensing means connected to said power source for control of said power source, said sensing means comprising a weight supported at a point horizontally and vertically displaced with respect to its center of gravity to respond to lateral and vertical accelerations, force producing means connected between said sprung and unsprung masses and to said sensing means and power source, said sensing means causing said force producing means to develop forces in proportion to accelerations of said sprung mass and also in proportion to the relative velocity of said sprung and unsprung masses.

2. In a stabilizer for a vehicle having sprung and unsprung masses, a power source, a sensing means, a control means associated with said sensing means, a resilient support for supporting said sensing means on said sprung mass for response to lateral and vertical accelerations, a hydraulic device connected between said sprung and unsprung masses and to said sensing means and power source, said control means, in response to said sensing means, causing said hydraulic device to develop forces varying in response to said accelerations of said sprung mass, said control means comprising a pilot valve for controlling fluid flow to said hydraulic device, and feedback means responsive to said hydraulic device for varying said sensing means response.

3. In a stabilizer for a vehicle having sprung and unsprung masses, a power source, a sensing means, a control means associated with said sensing means, a resilient support for supporting said sensing means on said sprung mass for response to lateral and vertical accelerations, a hydraulic device connected between said sprung and unsprung masses and to said sensing means and power source, said control means, in response to said sensing means, causing said hydraulic device to develop forces in proportion to said accelerations of said sprung mass and also in proportion to the relative velocity of said sprung and unsprung masses, said control means comprising a pilot valve for controlling fluid flow to said hydraulic device, and feedback means responsive to said hydraulic device for varying said sensing means response due to sprung mass accelerations, and power supply compensation means for applying a force to said sensing means proportional to pressure variations of said power supply.

4. In a stabilizer for a vehicle having sprung and unsprung masses, a power source, a sensing means, a control means associated with said sensing means, means for supporting said sensing means on said sprung mass for response to lateral and vertical accelerations, a hydraulic device connected between said sprung and unsprung masses and to said sensing means and power source, said control means, in response to said sensing means causing said hydraulic device to develop forces responsive to said accelerations of said sprung mass and also in response to the relative movements of said sprung and unsprung masses, said control means comprising a pilot valve, supply and exhaust valves for controlling said hydraulic device, said pilot valve when in one condition causing an opening of said supply valve and a closing of said exhaust valve, said pilot valve when in another position causing a closing of said supply valve and an opening of said exhaust valve, said hydraulic device comprising a hydraulic cylinder and cooperating piston, said supply and exhaust valves providing fluid control for a first chamber formed by said cylinder and one side of said piston, and fluid flow damping valves for connecting said power supply to a second fluid chamber formed by said cylinder and the other side of said piston.

5. In a stabilizer for a vehicle having sprung and unsprung masses, a power source, sensing and control means for said power source, and force producing means connected between said sprung and unsprung masses and to said sensing means and power source, said sensing and control means causing said force producing means to develop forces varying in response to both vertical and lateral accelerations of said sprung mass, support means for the sensing means positioned to cause said sensing and control means to be more responsive to vertical acceleration than lateral acceleration.

6. In a vehicle having a sprung mass positioned above its roll axis and a ride stabilizer and tilter, an inertia sensing element responsive to vertical and lateral accelerations, said sensing element being mounted on said vehicle sprung mass above and to one side of the roll axis of said sprung mass, said inertia sensing element response to vertical acceleration exceeding its response to lateral accelerations as the sprung mass is accelerated angularly about said roll axis.

7. In a vehicle, sprung and unsprung masses with spring means between said sprung and unsprung masses, a power source, sensing and control means connected to said power source, and force producing means connected between said sprung and unsprung masses and to said sensing and control means and said power source, a first control member in said sensing and control means for causing said force producing means to develop forces varying with accelerations of said sprung mass, a second control member in said sensing and control means for developing damping forces varying with the relative velocity of said sprung and unsprung masses, said damping forces corresponding to several times critical damping for the normal resonance of said sprung mass and said spring means.

8. In a vehicle, a pair of spaced apart masses with spring means between said spaced apart masses, a power source, sensing and control means connected to said power source, and force producing means connected between said spaced apart masses and to said sensing and control means and said power source, said sensing and control means causing said force producing means to develop forces in response to accelerations of one of said pair of masses and damping means in said sensing and control means for developing damping forces in response to the relative velocity of said pair of masses, said damping forces corresponding to several times critical damping for the normal resonance of said one mass and said spring means.

9. A fluid shock absorbing system for a four wheeled vehicle having a sprung mass comprising a shock absorbing device for each wheel, a power source, shock absorbing devices for two of said wheels being connected to said power source to be power driven, a sensing and control device for each of said power driven shock absorbers each connected to said power source and to its associated power driven shock absorber, said sensing and control devices controlling said power driven shock absorbers to respond to vertical and lateral accelerations of said sprung mass, said sensing and control devices causing said power driven shock absorbers to provide a tilting of said sprung mass due to said lateral accelerations, and leveling means for causing said sensing and control devices to reposition said power shock absorbers to adjust the average level of said sprung mass.

10. A fluid shock absorbing system for a four wheeled vehicle having a sprung mass comprising a shock absorbing device for each wheel, a power source, shock absorbing devices for two of said wheels being connected to said power source to be power driven, a sensing and control device for each of said power driven shock absorbers each connected to said power source and to its associated power driven shock absorber, said sensing and control devices controlling said power driven shock absorbers to respond to vertical and lateral accelerations of said sprung mass, said sensing and control devices causing said power driven shock absorbers to provide a tilting of said sprung mass due to said lateral accelerations, and leveling means for causing said sensing and control devices to reposition said power shock absorbers to adjust the average level of said sprung mass, said leveling means comprising a sprung mass position detector device, a drive motor controlled by said position detecting device, a gear train driven by said drive motor, said sensing and control devices being controlled to cause said power shock absorbers to reposition said sprung mass to a position satisfying said position detecting device.

11. In a stabilizer for a vehicle having sprung and unsprung masses, a fluid power source, a sensing means, a control means connected to said sensing means, a support for movably supporting said sensing means on said sprung mass for response to lateral and vertical accelerations, a hydraulic device connected between said sprung and unsprung masses and to said sensing means and power source, a piston having a first and second area in said hydraulic device, said control means in response to said sensing means causing large fluid pressure variations on said first area of said piston for developing forces dependent upon said accelerations of said sprung mass, damper means for providing said second area of said piston with small fluid pressure variations relative to said first area pressure variations, said small fluid pressure variations being dependent upon the relative velocity of said sprung and unsprung masses and feedback means responsive to said small fluid pressure variations for controlling said sensing means in dependence upon the relative velocity of said sprung and unsprung masses.

12. In a stabilizer for a vehicle having sprung and unsprung masses, a power source, sensing and control means for said power source, and force producing means connected between said sprung and unsprung masses, said sensing and control means causing said force producing means to develop forces in response to acceleration of said sprung mass and also in response to the relative velocity of said sprung and unsprung masses, said force producing means comprising a fluid cylinder and cooperating power piston, pressure feed and exhaust valves having fluid connection to said cylinder, said pressure feed and exhaust valves having control pistons and fluid control portions, said pressure feed and exhaust control pistons having a first area responsive to fluid pressures of said sensing and control means, said pressure feed control piston having a second area responsive to fluid pressure of said power source, said fluid control portions being responsive to fluid pressures of said cylinder, said fluid pressures acting on said valve control piston areas and control portions to provide balanced pressure feed and exhaust valve forces with said sensing and control means fluid pressures acting in a substantially linear response range.

13. In a stabilizer for a vehicle having sprung and unsprung masses, a hydraulic power source, a hydraulic cylinder connected between said sprung and unsprung masses, sensing and control means connected hydraulically to said power source and to said cylinder, said sensing and control means including an inertia controlled pilot valve mounted on said sprung mass, said sensing and control means including power valve means responsive to pressures determined by said pilot valve, said power valve means being biased by the pressure of said power source to cause said inertia control pilot valve to operate in a range where its pressures are substantially linear with valve displacement.

14. In a stabilizer for a vehicle having sprung and unsprung masses, a power source, sensing and control means for said power source, and force producing means connected between said sprung and unsprung masses, said sensing and control means causing said force producing means to develop forces varying with the acceleration of said sprung mass and also varying with the relative velocity of said sprung and unsprung masses, said force producing means comprising a fluid cylinder and cooperating power piston, pressure feed and exhaust valves for controlling the pressure in said fluid cylinder, said pressure feed and exhaust valves each having a control piston, said control piston having a first area responsive to fluid pressure of said sensing and control means, said control piston having a second area biased by the fluid pressure of said power source, said biased condition of said second area causing fluid pressure of said sensing and control means to be in a range which is substantially linear.

15. In a power shock absorber for a vehicle having sprung and unsprung masses, a hydraulic power source, a hydraulic cylinder connected to said sprung and unsprung masses and to said power source for producing force between said sprung and unsprung masses, an inertia controlled pilot valve mounted on said sprung mass, mechanically separate pressure supply and pressure discharge valves for said hydraulic cylinder, said pressure supply and pressure discharge valves being controlled by said pilot valve.

16. In a stabilizing fluid pressure system, a power driven fluid shock absorber, sensing and control means, said sensing and control means comprising a sensing mass pivoted at a position displaced vertically and horizontally from the center of gravity of said mass, a continuous fluid flow orifice, a control valve member actuated by said sensing mass and positioned adjacent said orifice to vary the effective size of said orifice in response to the pivoted position of said mass, bias means for damping movement of said mass about its pivot, and velocity control means responsive to the velocity of the shock absorber for modifying the position of said pivoted mass.

17. In a stabilizing fluid pressure system, a source of system pressure, a power driven fluid shock absorber, sensing and control means connected to said source of system pressure and to said shock absorber, said sensing and control means comprising a sensing mass pivoted at a position displaced vertically and horizontally from the center of gravity of said mass, a continuous fluid flow orifice, a control valve member actuated by said sensing mass and positioned adjacent said orifice to vary the effective size of said orifice in response to the pivoted position of said mass, bias means for damping movement of said mass about its pivot, means responsive to the operation of the shock absorber for modifying the position of said pivoted mass, and compensating system pressure responsive means for modifying the position of said sensing mass in response to changes in system pressure.

18. In a stabilizing fluid pressure system utilizing a power driven fluid shock absorber, sensing and control means, said sensing and control means comprising a sensing mass pivoted at a position displaced vertically and horizontally from the center of gravity of said mass, a continuous fluid flow orifice, a control valve member actuated by said sensing mass and positioned adjacent said orifice to vary the effective size of said orifice in responsive to the pivoted position of said mass, bias means for damping movement of said mass about its pivot, and compensating system pressure responsive means for modifying the position of said sensing mass in response to changes in system pressure.

19. A vehicle having relatively movable masses, a cylinder and piston connected between said relatively movable masses, said piston having a greater effective area on one side than on the other, a source of liquid under pressure, means applying liquid pressure from the source to the cylinder at the side of the piston having the lesser area during quiescent conditions between the relatively movable masses of the vehicle, pressure controlling valve means connected to apply liquid from said source to the cylinder at the other side of the piston having the greater area at a pressure less than the pressure at the first side of the piston during quiescent conditions between the relatively movable masses of the vehicle, inertia operated sensing means connected to said pressure controlling valve means and actuating said pressure controlling valve means upon operation of the sensing means in one direction to increase the liquid pressure on the side of the piston having the greater area to cause relative movement of said vehicle masses in one direction, and said sensing means actuating said pressure controlling valve means upon operation of the sensing means in the opposite direction to decrease the liquid pressure on the side of the piston having the greater area to cause relative movement of said vehicle masses in the opposite direction.

20. In a stabilizing fluid pressure system utilizing a power driven fluid shock absorber, sensing and control means for said power driven fluid shock absorber, said sensing and control means comprising a sensing mass pivoted at a position displaced from the center of gravity of said mass, a continuous fluid flow orifice, a control valve member actuated by said sensing mass and positioned adjacent said orifice to vary the effective size of said orifice in response to the pivoted position of said mass, bias means for damping movement of said mass about its pivot, and compensating system pressure responsive means for modifying the position of said sensing mass in response to changes in system pressure.

21. In a stabilizing fluid pressure system, a source of fluid pressure for said pressure system, a power driven fluid shock absorber, sensing and control means connected to said source of fluid pressure and to said shock absorber, said sensing and control means including a sensing mass pivoted at a position displaced from the center of gravity of said mass, a continuous fluid flow orifice, a control valve member actuated by said sensing mass and positioned adjacent said orifice to vary the effective size of said orifice in response to the pivoted position of said mass, bias means for damping movement of said mass about its pivot, means responsive to the operation of the shock absorber for modifying the position of said pivot mass, and compensating system pressure responsive means for modifying the position of said sensing mass in response to changes in system pressure.

22. In a stabilizing fluid pressure system, a power driven fluid shock absorber, sensing and control means for controlling the operation of said shock absorber, said sensing and control means comprising a sensing mass pivoted at a position displaced from the center of gravity of the mass, a continuous fluid flow orifice, a control valve member actuted by said sensing mass and positioned adjacent said orifice to vary the effective size of said orifice in response to the pivoted position of said mass, bias means for damping movement of said mass about its pivot, and velocity control means responsive to the velocity of the shock absorber for modifying the position of said pivoted mass.

References Cited in the file of this patent

UNITED STATES PATENTS

| | | |
|---|---|---|
| 2,032,124 | Funston | Feb. 25, 1936 |
| 2,082,552 | Riedel | June 1, 1937 |
| 2,353,503 | Rost | July 11, 1944 |
| 2,492,990 | Hanna | Jan. 3, 1950 |
| 2,743,941 | Walker | May 1, 1956 |
| 2,778,656 | May | Jan. 22, 1957 |
| 2,802,674 | Jackson | Aug. 13, 1957 |